(12) United States Patent
Oyobe et al.

(10) Patent No.: US 7,495,399 B2
(45) Date of Patent: Feb. 24, 2009

(54) POWER OUTPUT APPARATUS AND VEHICLE INCLUDING THE SAME

(75) Inventors: Hichirosai Oyobe, Toyota (JP); Tetsuhiro Ishikawa, Nishikamo-gun (JP); Katsuhiro Asano, Toyoake (JP); Yoshitoshi Watanabe, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 231 days.

(21) Appl. No.: 10/587,434

(22) PCT Filed: Nov. 24, 2005

(86) PCT No.: PCT/JP2005/022043

§ 371 (c)(1),
(2), (4) Date: Jul. 27, 2006

(87) PCT Pub. No.: WO2006/057435

PCT Pub. Date: Jun. 1, 2006

(65) Prior Publication Data

US 2007/0158948 A1    Jul. 12, 2007

(30) Foreign Application Priority Data

Nov. 25, 2004    (JP) .............................. 2004-340929

(51) Int. Cl.
*H02P 7/00* (2006.01)
*H02P 7/14* (2006.01)

(52) U.S. Cl. ........................ 318/143; 318/140; 318/148; 318/157; 318/805; 318/810; 318/811; 322/24; 322/28; 322/25; 363/71; 363/40; 363/41

(58) Field of Classification Search ................ 318/143, 318/140, 148, 157, 805, 810, 801; 322/24, 322/28, 25; 363/71, 40, 41
See application file for complete search history.

(56) References Cited

U.S. PATENT DOCUMENTS 3,781,615 A * 12/1973 Mokrytzki et al. .......... 318/801
3,792,268 A *  2/1974 Bjerke et al. ................ 250/555

(Continued)

FOREIGN PATENT DOCUMENTS

JP    A 8-126121    5/1996

(Continued)

OTHER PUBLICATIONS

Seung-Ki Sul et al., "An Integral Battery Charger for Four-Wheel Drive Electric Vehicle," IEEE Transactions on Industry Applications, IEEE Inc. New York, US, vol. 31, No. 5, pp. 1096-1999, Sep./Oct. 1995.

*Primary Examiner*—Rita Leykin
(74) *Attorney, Agent, or Firm*—Oliff & Berridge, PLC

(57) ABSTRACT

A coordination control device of a power output apparatus includes a coordination control unit. The coordination control unit calculates an intermediate value between the maximum value and minimum value among voltage controls for a first motor generator, and voltage control from an AC voltage control generation unit to generate an AC voltage across neutral points of first and second motor generators, and outputs a value that is each phase voltage control for the first and second motor generators minus the calculated intermediate value to a signal generation unit as the final voltage control for the first and second motor generators.

14 Claims, 12 Drawing Sheets

U.S. PATENT DOCUMENTS

| | | | |
|---|---|---|---|
| 4,219,768 A * | 8/1980 | Gobaud | 322/8 |
| 5,099,186 A | 3/1992 | Rippel et al. | |
| 5,210,473 A * | 5/1993 | Backstrand | 318/99 |
| 5,719,486 A * | 2/1998 | Taniguchi et al. | 322/28 |
| 5,739,650 A * | 4/1998 | Kimura et al. | 318/400.07 |
| 7,362,597 B2 * | 4/2008 | Ishikawa et al. | 363/71 |
| 2002/0057582 A1 | 5/2002 | Nakayama et al. | |

FOREIGN PATENT DOCUMENTS

| | | |
|---|---|---|
| JP | A 9-56007 | 2/1997 |
| JP | A 10-191501 | 7/1998 |
| JP | A 2002-218793 | 8/2002 |
| JP | A 2002-374604 | 12/2002 |
| JP | A 2004-120853 | 4/2004 |

* cited by examiner

POWER OUTPUT APPARATUS AND VEHICLE INCLUDING THE SAME

TECHNICAL FIELD

The present invention relates to a power output apparatus and a vehicle including the same. Particularly, the present invention relates to a power output apparatus that can generate AC (alternating current) voltage and output the same to an external AC load, and a vehicle including such a power output apparatus.

BACKGROUND ART

Japanese Patent Laying-Open No. 2002-218793 discloses a power output apparatus incorporated in hybrid vehicles and electric vehicles with a motor generator as the power source. The power output apparatus includes a 2Y motor having two 3-phase coils wound around the same stator or two motor generators, two inverters corresponding to the 2Y motor or two motor generators, respectively, and a DC (direct current) power supply connected between the neutral points of the 2Y motor or two motor generators. In accordance with this power output apparatus, the inverter input voltage can be adjusted within a wide range by setting the potential difference between the neutral points of the 2Y motor or two motor generators smaller or larger than the voltage of the DC power supply under control of the two inverters.

There is the conventional approach of using a hybrid vehicle or electric vehicle as the AC power supply employing the power output apparatus incorporated in the hybrid vehicle or the like. Specifically, this approach is directed to using the hybrid vehicle or the like as the backup electric power source in the case of emergency and disaster or as the commercial power supply when commercial power supply facilities are not available in the neighborhood such as at camps. Such usage methods will increase the commercial value of the hybrid vehicle and the like.

Japanese Patent Laying-Open No. 2002-374604 discloses the approach of allowing an AC output of 100V from a vehicle that is mounted with a secondary battery. The vehicle includes a secondary battery, a dedicated AC100 V inverter to provide an AC output of 100 V using the power from the secondary battery. The limitation of an AC100V output is allowed based on the SOC (State of Charge) of the secondary battery and other states of the system. Since the driving motor can be controlled favorably using power from the secondary battery by the limitation of the AC100 V output in accordance with this vehicle, favorable driving control of the vehicle can be ensured, and an AC output of 100 V can be provided using the power from the secondary battery.

Although it is desirable to use a hybrid vehicle or the like as an AC power supply, as set forth above, the power output apparatus disclosed in Japanese Patent Laying-Open No. 2002-218793 cannot generate and provide to an external source an AC power.

Although the vehicle disclosed in Japanese Patent Laying-Open No. 2002-374604 is advantageous in that an output of AC100 V can be provided to an external source and favorable driving control for the vehicle can be ensured, no measures are taken from the standpoint of efficient voltage utilization to obtain the maximum AC power. This vehicle is disadvantageous in that a dedicated inverter for AC100 V output is required, leading to the possibility that reduction in size, weight, and cost of the vehicle may be prevented.

DISCLOSURE OF THE INVENTION

In view of the foregoing, an object of the present invention is to provide a power output apparatus that can output the maximum AC power to an external source utilizing voltage efficiently.

Another object of the present invention is to provide a vehicle incorporated with a power output apparatus that can output the maximum AC power to an external source utilizing voltage efficiently.

According to the present invention, a power output apparatus includes first and second motor generators, first and second inverters connected to the first and second motor generators, respectively, and receiving input voltage from a voltage supply line, and a control device controlling the operation of the first and second inverters such that an AC voltage is generated across the neutral points of the first and second motor generators using the input voltage. The control device controls the first and second inverters in coordination such that the intermediate value between the maximum value and minimum value of the voltage controls for the first and second motor generators is equivalent to the intermediate potential of the input voltage.

Preferably, the control device further controls the operation of the first inverter and/or second inverter such that at least one of the first and second motor generators is driven using the input voltage.

Preferably, the control device includes a coordination control unit controlling the first and second inverters in coordination by calculating the intermediate value and subtracting the calculated intermediate value from the voltage control of each phase of the first and second motor generators.

Preferably, the control device includes a voltage compensation unit compensating for voltage drop caused by internal impedance of the first and second motor generators.

Preferably, the voltage compensation unit calculates a voltage compensation value based on AC current flowing across the neutral points of the first and second motor generators to correct the control value of the AC voltage to be generated across the neutral points of the first and second motor generators, using the calculated voltage compensation value.

Preferably, the power output apparatus further includes a DC power supply, and an up-converter boosting and providing onto the voltage supply line the DC voltage output from the DC power supply. The control device further controls the operation of the up-converter such that the DC voltage from the DC power supply is boosted to the input voltage.

Further, according to the present invention, a vehicle includes a power output apparatus set forth above, an internal combustion engine coupled to the first motor generator of the power output apparatus, and a driving wheel coupled to the second motor generator of the power output apparatus, driven by the second motor generator. The control device of the power output apparatus controls the operation of the first and second inventors of the power output apparatus such that the first and second motor generators are driven and AC voltage is generated across the neutral points of the first and second motor generators using the input voltage. The first and second motor generators output the AC voltage generated across their neutral points to an external electric load electrically connected between the neutral points.

In the power output apparatus of the present invention, the control device controls the operation of the first and second inverters such that AC voltage is generated across the neutral points of the first and second motor generators using the input voltage. Since the control device controls the first and second inverters in cooperation such that the intermediate value between the maximum value and the minimum value of the voltage controls for the first and second motor generators is equivalent to the intermediate potential of the input voltage, generation of voltage controls of the first and second inverters that exceeds the voltage controllable range of the first and second inverters, i.e. the voltage range from the potential of the negative electrode side to the potential of the positive electrode side of the input voltage of the first and second inverters, is suppressed to the minimum.

Therefore, in accordance with the present invention, the maximum AC power with little distortion can be generated and output to an external AC load. In other words, since the input voltage of the first and second inverters can be suppressed to the minimum required level, the stability of the system is improved.

In the power output apparatus of the present invention, since the control device includes a voltage compensation unit that compensates for voltage drop caused by the internal impedance of the first and second inverters, the accuracy of the voltage controls of the first and second inverters is improved. Thus, variation in the output AC voltage can be suppressed.

A dedicated inverter to generate and output to an external source an AC voltage is dispensable in the vehicle according to the present invention since a power output apparatus set forth above is incorporated. Therefore, the present invention is not disadvantageous in connection with reducing the size, weight, and cost of the vehicle.

In accordance with the vehicle of the present invention, the control device of the power output apparatus controls the operation of the first and second device of the power output apparatus such that the first motor generator coupled to the internal combustion engine and the second motor generator coupled to the driving wheel for driving the driving wheel are driven and an AC voltage is generated across the neutral points of the first and second motor generators. Accordingly, AC voltage can be generated across the neutral points of the first and second generators for output to an external AC load while effecting regenerative power generation by the first motor generator and generating drive torque to the driving wheel by the second motor generator.

BEST MODE FOR CARRYING OUT THE INVENTION

Figure 1:
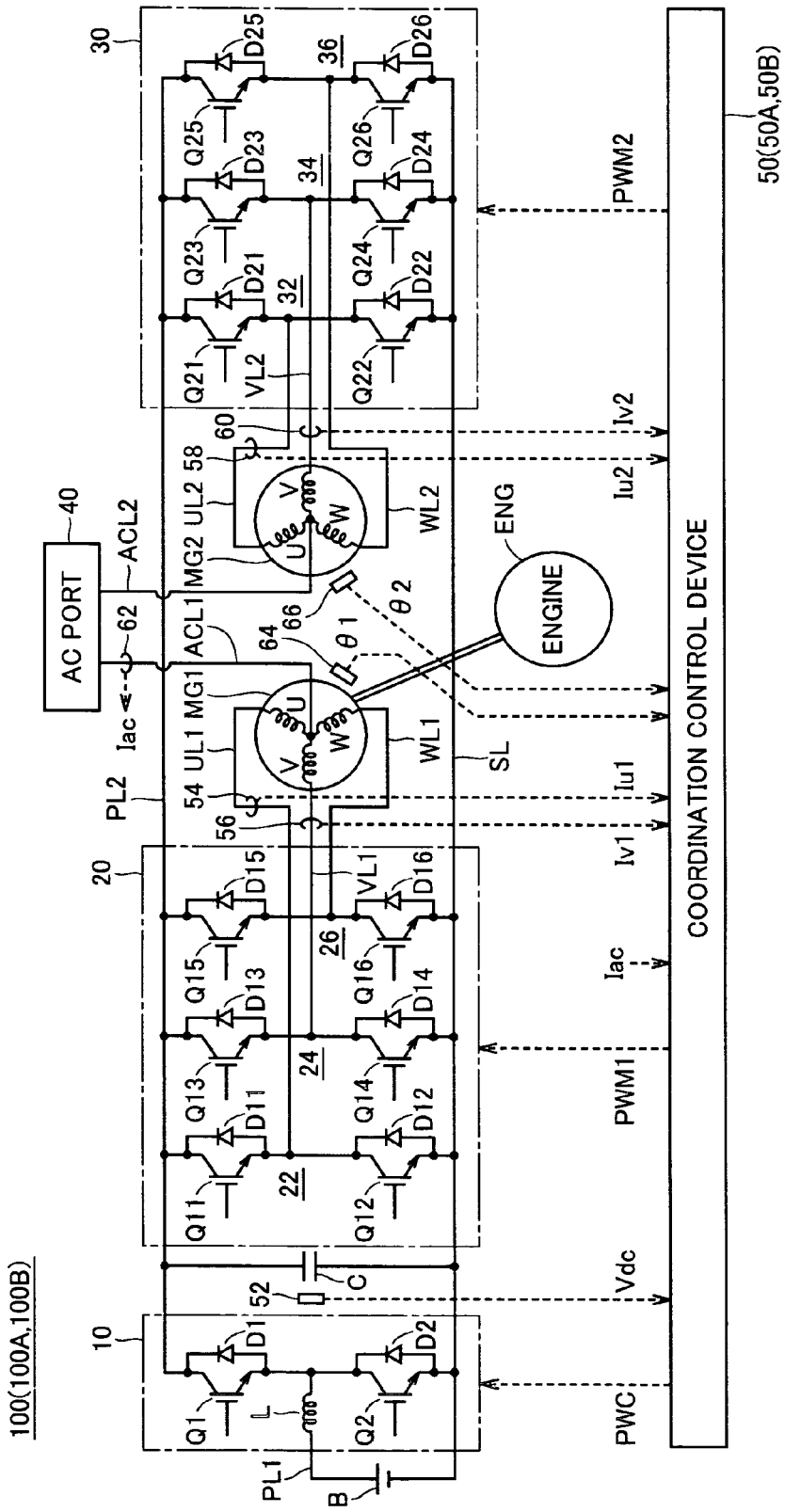
FIG. 1 is a schematic block diagram of a power output apparatus according to a first embodiment of the present invention.

Embodiments of the present invention will be described hereinafter with reference to the drawings. In the drawings, the same or corresponding components have the same reference characters allotted, and description thereof will not be repeated.

First Embodiment

FIG. 1 is a schematic block diagram of a power output apparatus 100 according to a first embodiment of the present invention. Referring to FIG. 1, power output apparatus 100 includes a battery B, an up-converter 10, inverters 20 and 30, an AC port 40, a coordination control device 50, a capacitor C, a voltage sensor 52, current sensors 54, 56, 58, 60 and 62, rotation sensors 64 and 66, power supply lines PL1 and PL2, a ground line SL, U-phase lines UL1 and UL2, V-phase lines VL1 and VL2, W-phase lines WL1 and WL2, and AC output lines ACL1 and ACL2.

Motor generator MG1 is formed of a 3-phase AC synchronous motor, for example. Motor generator MG1 generates AC voltage using the rotation force from an engine ENG to provide the generated AC voltage to inverter 20. Motor generator MG1 also generates a driving force by the AC voltage from inverter 20 to start engine ENG. Motor generator MG2 is also formed of a 3-phase AC synchronous motor, for example. Motor generator MG2 generates AC voltage across the neutral points of motor generators MG1 and MG2 together with motor generator MG1. Motor generators MG1 and MG2 output the AC voltage generated across the neutral points thereof to AC port 40 via AC output lines ACL1 and ACL2.

Battery B identified as a DC power supply is formed of, for example, a nickel-hydrogen or lithium-ion secondary battery. Battery B outputs the generated DC voltage to up-converter 10, and is charged by the DC voltage output from up-converter 10.

Up-converter 10 includes a reactor L, npn transistors Q1 and Q2, and diodes D1 and D2. Reactor L has one end connected to power supply line PL1, and the other end connected to the connection node of npn transistors Q1 and Q2. Npn transistors Q1 and Q2 are connected in series between power supply line PL2 and ground line SL to receive a control signal PWC from coordination control device 50 at its base terminal. Diodes D1 and D2 are connected across the collector and emitter of npn transistors Q1 and Q2, respectively, so as to conduct current from the emitter side towards the collector side.

Inverter 20 includes a U-phase arm 22, a V-phase arm 24, and a W-phase arm 26. U-phase arm 22, V-phase arm 24 and W-phase arm 26 are connected in parallel between power supply line PL2 and ground line SL. U-phase arm 22 is formed of npn transistors Q11 and Q12 connected in series. V-phase arm 24 is formed of npn transistors Q13 and Q14 connected in series. W-phase arm 26 is formed of npn transistors Q15 and Q16 connected in series. Diodes D11-D16 conducting current from the emitter side to the collector side are connected across the collector and emitter of npn transistors Q11-Q16, respectively. The connection nodes of respective npn transistors in each phase arm are connected via U-phase line UL1, V-phase line VL1 and W-phase line WL1 to respective U, V and W phase coils of motor generator MG1 at an end opposite to the end corresponding to the neutral point.

Inverter 30 includes a U-phase arm 32, a V-phase arm 34 and a W-phase arm 36. U-phase arm 32, V-phase arm 34 and W-phase arm 36 are connected in parallel between power supply line PL2 and ground line SL2. U-phase arm 32 is formed of npn transistors Q21 and Q22 connected in series. V-phase arm 34 is formed of npn transistors Q23 and Q24 connected in series. W-phase arm 36 is formed of npn transistors Q25 and Q26 connected in series. Diodes D21-D26 conducting current from the emitter side to the collector side are connected across the collector and emitter of npn transistors Q21-Q26, respectively. In inverter 30, the connection nodes of respective npn transistors in each phase arm are connected via U-phase line UL2, V-phase line VL2, and W-phase line WL2 to respective U, V and W phase coils of motor generator MG2 at an end opposite to the end corresponding to the neutral point.

Capacitor C is connected between power supply line PL2 and ground line SL to reduce the effect caused by voltage variation on inverters 20 and 30 and up-converter 10.

Up-converter 10 responds to control signal PWC from coordination control device 50 to boost the DC voltage from battery B by accumulating the current that flows according to the switching operation of npn transistor Q2 as magnetic field energy at reactor L, and provides the boosted voltage onto power supply line PL2 via diode D1 in synchronization with the OFF timing of npn transistor Q2. Up-converter 10 responds to control signal PWC from coordination control device 50 to down-convert the DC voltage from inverter 20 via power supply line PL2 to the voltage level of battery B to charge battery B.

Inverter 20 responds to a control signal PWM1 from coordination control device 50 to convert the DC voltage supplied from power supply line PL2 into AC voltage, and provides the AC voltage to motor generator MG1. Accordingly, motor generator MG1 is driven so as to generate the desired torque. Inverter 20 also responds to control signal PWM1 from coordination control device 50 to convert the AC voltage that is regenerative-produced by motor generator MG1 into DC voltage, which is output onto power supply line PL2. Inverter 30 responds to a control signal PWM2 from coordination control device 50 to convert the DC voltage from power supply line PL2 into AC voltage, which is output to motor generator MG2.

At the request of AC voltage output to an external AC load connected to AC port 40, inverters 20 and 30 generate AC voltage across the neutral points of motor generators MG1 and MG2. In other words, inverters 20 and 30 vary the potentials at the neutral points of motor generators MG1 and MG2 with a desired AC frequency based on control signals PWM1 and PWM2 from coordination control device 50.

When AC voltage is generated across the neutral points of motor generators MG1 and MG2, inverters 20 and 30 operate in coordination based on control signals PWM1 and PWM2 from coordination control device 50 such that an intermediate value between the maximum value and minimum value of the voltage controls for motor generators MG1 and MG2 attains the intermediate potential of the input voltage of inverters 20 and 30 (the intermediate potential between the potential at the positive electrode side and the potential at the negative electrode side of the input voltage of inverters 20 and 30). The coordination operation of inverters 20 and 30 will be described in detail afterwards.

AC port 40 is an output terminal to provide the AC voltage generated across the neutral points of motor generators MG1 and MG2 to an external AC load. A power supply port of an electrical apparatus or a domestic power supply port for emergency will be connected to AC port 40. AC port 40 is connected to AC output lines ACL1 and ACL2 connected to the neutral points of motor generators MG1 and MG2, respectively.

Voltage sensor 52 detects the voltage across the terminals of capacitor C, i.e. input voltage Vdc of inverters 20 and 30, and provides the voltage to coordination control device 50. Current sensors 54 and 56 function to detect the motor current of motor generator MG1, and are provided at U-phase line UL1 and V-phase line VL1, respectively. Current sensors 54 and 56 detect a U-phase current Iu1 and a V-phase current Iv1 of motor generator MG1, which are output to coordination control device 50. Current sensors 58 and 60 function to detect the motor current of motor generators MG2, and are provided at U-phase line UL2 and V-phase line VL2, respectively. Current sensors 58 and 60 detect a U-phase current Iu2 and a V-phase current Iv2 of motor generator MG2, which are output to coordination control device 50. Current sensor 62 provided at AC output line ACL1 detects AC current Iac generated by motor generators MG1 and MG2, which is output to coordination control device 50. Rotation sensors 64 and 66 detect a rotation position $\theta 1$ of motor generator MG1 and a rotation position $\theta 2$ of motor generator MG2, respectively, which are output to coordination control device 50.

Coordination control device 50 generates control signal PWC to drive up-converter 10 based on a torque control value TR1 and the motor revolution count of motor generator MG1, the battery voltage of battery B, and input voltage Vdc of inverters 20 and 30. The generated control signal PWC is output to up-converter 10. The battery voltage of battery B is detected by a voltage sensor not shown. The motor revolution count of motor generator MG1 is calculated based on rotation position $\theta 1$ detected by rotation sensor 64.

Coordination control device 50 also generates control signal PWM1 to drive motor generator MG1 based on the motor current and torque control value TR1 of motor generator MG1, input voltage Vdc of inverter 20, and rotation position $\theta 1$ of motor generator MG1.

At the request of AC voltage output to an external AC load connected to AC port 40, coordination control device 50 generates control signal PWM1 while controlling the duty summation of npn transistors Q11, Q13 and Q15 of the upper arms and npn transistors Q12, Q14 and Q16 of the lower arms of inverter 20 such that AC voltage is generated across the neutral points of motor generators MG1 and MG2.

Coordination control device 50 controls the ON duty of npn transistors Q21, Q23, and Q25 of the upper arms and npn transistors Q22, Q24 and Q26 of the lower arms of inverter 30 to generate control signal PWM2 such that AC voltage is generated across the neutral points of motor generators MG1 and MG2.

When an AC voltage is to be generated across the neutral points of motor generators MG1 and MG2, coordination control device 50 operates inverters 20 and 30 in coordination such that an intermediate value between the maximum value and minimum value of the voltage controls for motor generators MG1 and MG2 attains the level of the intermediate potential of the input voltage of inverters 20 and 30. The operation of inverters 20 and 30 in coordination will be described in detail afterwards based on a functional block diagram of the portion related to coordination control of coordination control device 50.

Figure 2:
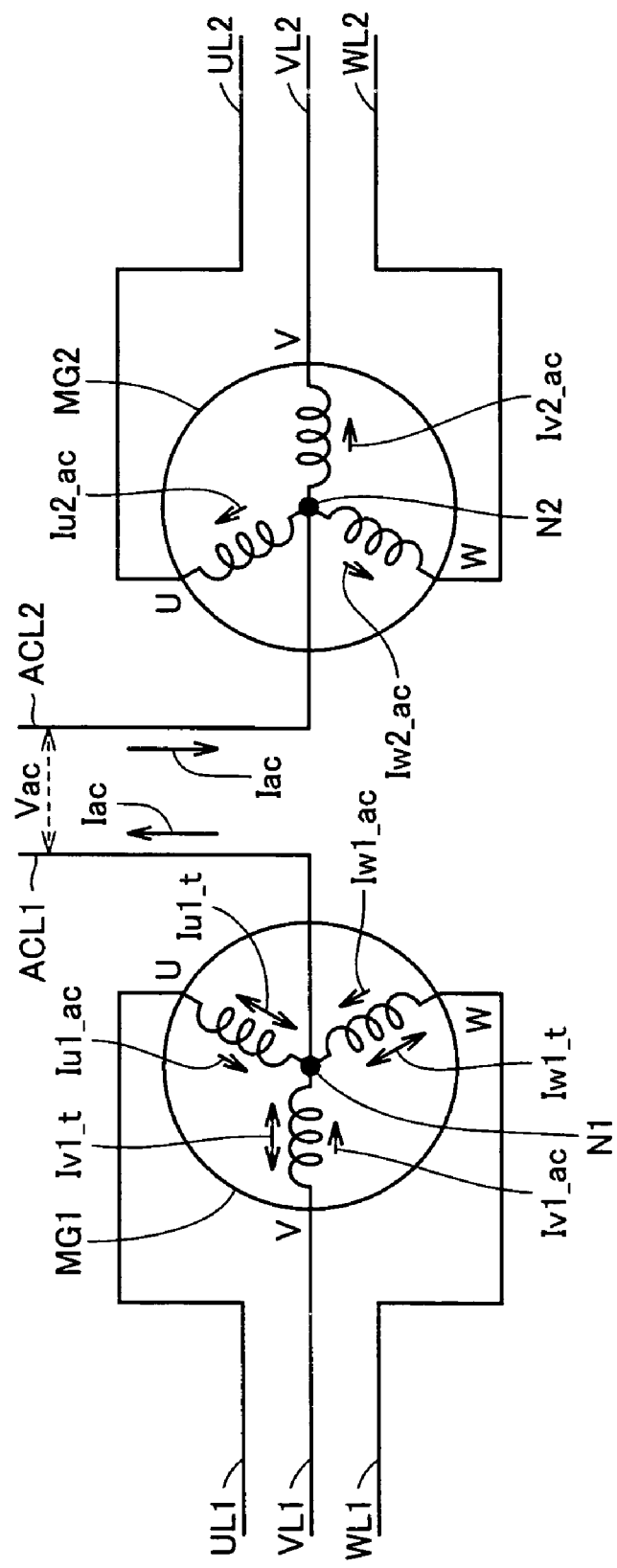
FIG. 2 is a diagram to describe current flowing to the motor generators of FIG. 1.

FIG. 2 is a diagram to describe current flowing to motor generators MG1 and MG2 of FIG. 1. FIG. 2 shows the current flow when regenerative driving of motor generator MG1 is carried out simultaneous to generation of AC voltage Vac. FIG. 2 also corresponds to the case where AC current Iac is conducted from neutral point N1 of motor generator MG1 to neutral point N2 of motor generator MG2.

Referring to FIG. 2, inverter 20 (not shown) connected to U-phase line UL1, V-phase line VL1 and W-phase line WL1 effects switching based on control signal PWM1 from coordination control device 50 (also not shown) to conduct a U-phase current formed of current components Iu1_t and Iu1_ac to the U-phase coil of motor generator MG1, the V-phase current formed of current components Iv1_t and Iv1_ac to the V-phase coil of motor generator MG1, and the W-phase current formed of current components Iw1_t and Iw1_ac to the W-phase coil of motor generator MG1.

Inverter 30 (not shown) connected to U-phase line UL2, V-phase line VL2 and W-phase line WL2 effects switching based on control signal PWM2 from coordination control device 50 to conduct U-phase current Iu2_ac, V-phase current Iv2_ac and W-phase current Iw2_ac to U, V and W phase coils of motor generator MG2, respectively.

Current components Iu1_t, Iv1_t and Iw1_t are currents to generate the regenerative torque at motor generator MG1. Current components Iu1_ac, Iv1_ac and Iw1_ac are currents to conduct AC current Iac from neutral point N1 of motor generator MG1 to AC output line ACL1. U-phase current Iu2_ac, V-phase current Iv2_ac and W-phase current Iw2_ac are currents to conduct AC current Iac to neutral point N2 of motor generator MG2 from AC output line ACL2. Current components Iu1_ac, Iv1_ac and Iw1_ac and the U, V and W-phase currents of Iu2_ac, Iv2_ac and Iw2_ac are of the same level equal to each other, and do not contribute to the torque of motor generators MG1 and MG2. The total value of current components Iu1_ac, Iv1_ac and Iw1_ac and the total value of currents Iu2_ac, Iv2_ac and Iw2_ac of the U, V and W phase each are identified as AC current Iac.

Figure 3:
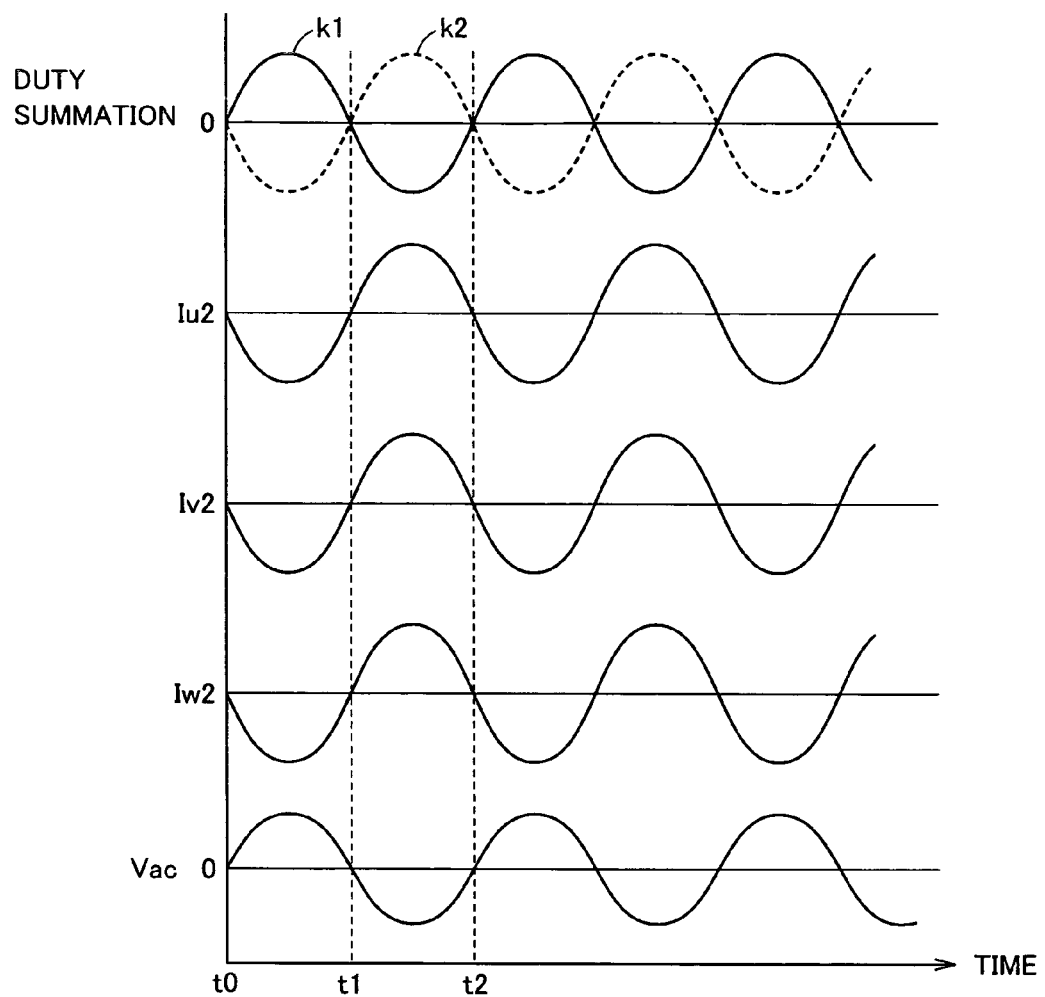
FIG. 3 is a waveform diagram of the duty summation of the inverters and AC voltage Vac.

FIG. 3 is a waveform diagram of the duty summation of inverters 20 and 30 and AC voltage Vac. Referring to FIG. 3, curve k1 represents the change in the duty summation during switching control of inverter 20, whereas curve k2 represents the change in the duty summation during switching control of inverter 30. As used herein, "duty summation" is the value of subtracting the ON duty of the lower arm from the ON duty of the upper arm in each inverter. In FIG. 3, a positive duty summation indicates that the neutral point potential of the corresponding motor generator is higher than the intermediate potential of inverter input voltage Vdc, i.e. Vdc/2, whereas a negative duty summation indicates that the neutral point potential is lower than intermediate potential Vdc/2.

In power output apparatus 100 of the first embodiment, coordination control device 50 alters the duty summation of inverter 20 periodically at the commercial AC frequency according to curve k1. Further, coordination control device 50 controls the switching of inverter 30 such that currents Iu2_ac, Iv2_ac and Iw2_ac of respective U, V and W phases with equal phase at the commercial AC frequency are conducted to motor generator MG2 and the duty summation of inverter 30 follows curve k2.

The duty summation of inverter 30 is altered periodically with a phase that is an inverted version of the phase with which the duty summation of inverter 20 is altered. Since inverter 30 conducts currents Iu2_ac, Iv2_ac and Iw2_ac of respective U, V and W phases with the same phase to motor generator MG2, coordination control device 50 controls inverter 30 such that, when the duty summation is positive, the lower arm of each phase arm is OFF and the ON duty of the upper arm in inverter 30 is controlled according to curve k2, and when the duty summation is negative, the upper arm of each phase arm is OFF and the ON duty of the lower arm in inverter 30 is controlled according to curve k2.

Thus, the potential at neutral point N1 of motor generator MG1 becomes higher than intermediate potential Vdc/2 of the inverter input voltage whereas the potential at neutral point N2 of motor generator MG2 becomes lower than intermediate potential Vdc/2 to result in generation of positive AC voltage Vac across neutral points N1 and N2 during time t0-t1. When an external AC load is connected to AC port 40, the extra current that cannot flow from the upper arm to the lower arm of inverter 20 flows from neutral point N1 to neutral point N2 via AC output line ACL1, the external AC load, and AC output line ACL2, and then from neutral point N2 to the lower arm of each phase arm in inverter 30.

During time t1-t2, the potential at neutral point N1 becomes lower than intermediate potential Vdc/2 whereas the potential at neutral point N2 becomes higher than intermediate potential Vdc/2 to result in generation of negative AC voltage Vac across neutral points N1 and N2. Accordingly, current flows from the upper arm in each phase arm of inverter 30 towards neutral point N1 via neutral point N2, AC output line ACL2, the external AC load load, and AC output line ACL1, and then from neutral point N1 to the lower arm of inverter 20.

Thus, inverters 20 and 30 cause generation of AC voltage Vac across neutral points N1 and N2 of motor generators MG1 and MG2.

The coordination operation of inverters 20 and 30 will be described hereinafter.

Figure 4:
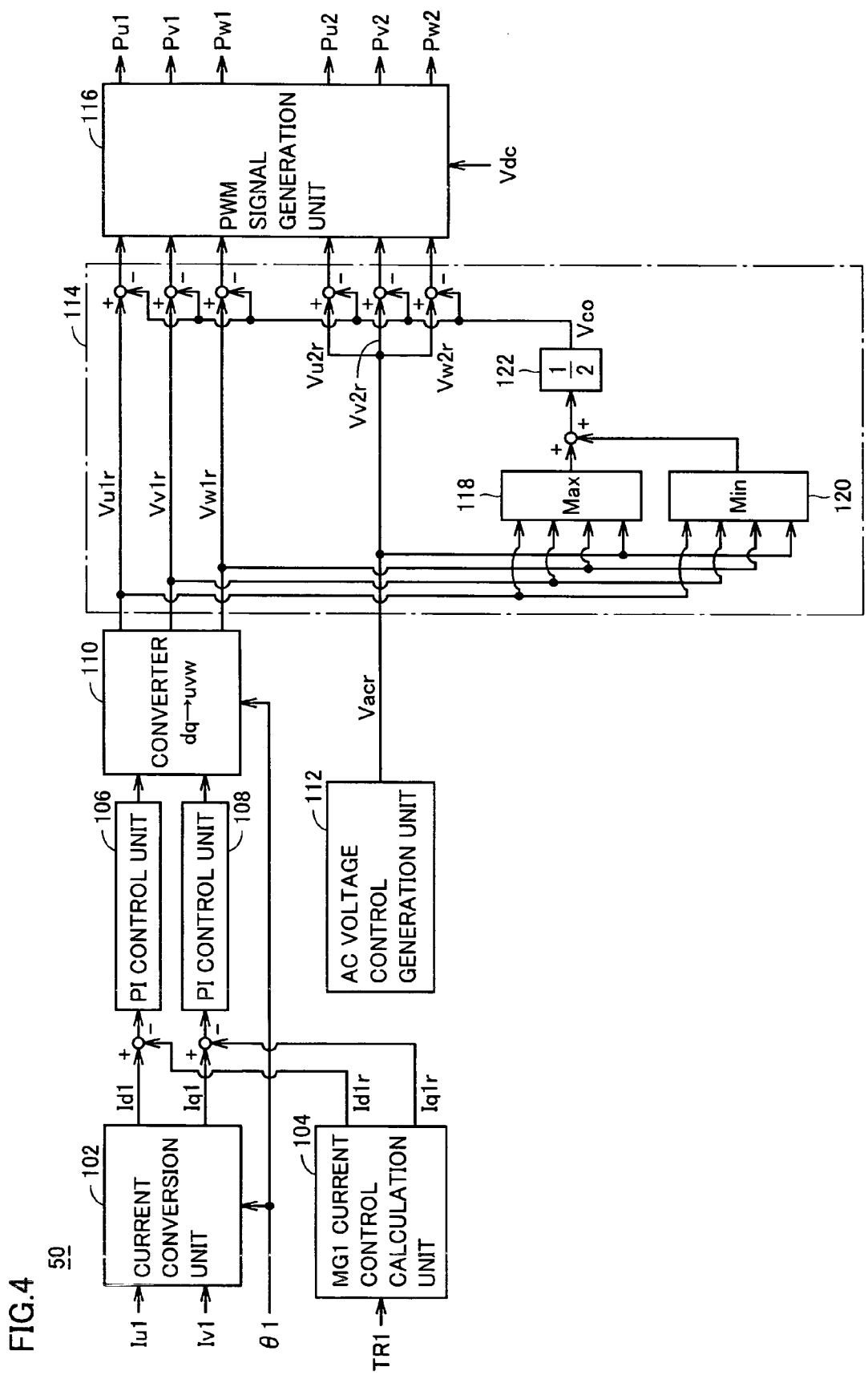
FIG. 4 is a functional block diagram of the configuration of the portion related to coordination control of the coordination control device of FIG. 1.

FIG. 4 is a functional block diagram representing a configuration of the portion related to coordination control of coordination control device 50 of FIG. 1. Referring to FIG. 4, coordination control device 50 includes a current conversion unit 102, a MG1 current control calculation unit 104, PI control units 106 and 108, a converter 110, an AC voltage control generation unit 112, a coordination control unit 114, and a PWM signal generation unit 116. A maximum value calculation unit 118, a minimum value calculation unit 120, and an average calculation unit 122 constitute coordination control unit 114.

Current conversion unit 102 converts U-phase current Iu1 and V-phase current Iv1 detected by current sensors 54 and 56, respectively, into a d-axis current Id1 and a q-axis current Iq1 using rotation position θ1 of motor generator MG1 detected by rotation sensor 64. MG1 current control calculation unit 104 calculates current control values Id1r and Iq1r of motor generator MG1 at the d-axis and q-axis based on torque control value TR1 of motor generator MG1.

PI control unit 106 receives the deviation between d-axis current Id1 from current conversion unit 102 and current control value Id1r from MG1 current control calculation unit 104 to conduct a proportional integral operation with the deviation as the input. The calculated result is output to converter 110. PI control unit 108 receives the deviation between q-axis current Iq1 from current conversion unit 102 and current control value Iq1r from MG1 current control calculation unit 104 to conduct a proportional integral operation with the deviation as the input. The calculated result is provided to converter 110.

Converter 110 uses rotation position θ1 of motor generator MG1 to convert the voltage control received from PI control units 106 and 108 into U-phase voltage control Vu1r, V-phase voltage control Vv1r and W-phase voltage control Vw1r of motor generator MG1.

AC voltage control generation unit 112 generates voltage control Vacr of AC voltage that is to be generated across the neutral points of motor generators MG1 and MG2. The generated voltage control Vacr is output as U-phase voltage control Vu2r, V-phase voltage control Vv2r and W-phase voltage control Vw2r of motor generator MG2.

Maximum value calculation unit 118 of coordination control unit 114 obtains the maximum value among U-phase voltage control Vu1r, V-phase voltage control Vv1r, and W-phase voltage control Vw1r from converter 110, and also voltage control Vacr from AC voltage control generation unit 112 for output. Minimum value calculation unit 120 obtains the minimum value among U-phase voltage control Vu1r, V-phase voltage control Vv1r, and W-phase voltage control Vw1r, and also voltage control Vacr for output. Average calculation unit 122 receives the added value of the output from maximum value calculation unit 118 and the output from minimum value calculation unit 120, and multiplies the received added value by ½ to provide the calculated result as coordination control output Vco.

Coordination control unit 114 subtracts coordination control output Vco from each of U-phase voltage control Vu1r, V-phase voltage control Vv1r and W-phase voltage control Vw1r of motor generator MG1, and also from each of U-phase voltage control Vu2r, V-phase voltage control Vv2r and W-phase voltage control Vw2r of motor generator MG2. Each calculated result is output to PWM signal generation unit 116 as the final voltage control of motor generators MG1 and MG2.

PWM signal generation unit 116 generates PWM (Pulse Width Modulation) signals Pu1, Pv1, and Pw1 corresponding to inverter 20 and PWM signals Pu2, Pv2 and Pw2 corresponding to inverter 30 based on each phase voltage control of motor generators MG1 and MG2 from coordination control unit 114 and input voltage Vdc of inverters 20 and 30. The generated PWM signals Pu1, Pv1, and Pw1 are output to inverter 20 as control signal PWM1. PWM signals Pu2, Pv2 and Pw2 are output to inverter 30 as control signal PWM2.

In coordination control device 50, coordination control unit 114 calculates an intermediate value between the maximum value and minimum value of voltage controls Vu1, Vv1 and Vw1 for motor generator MG1 and voltage controls Vu2, Vv2, and Vw2 for motor generator MG2, and subtracts the calculated intermediate value from each phase control value of motor generators MG1 and MG2 to output the result as the final voltage control of motor generators MG1 and MG2. In other words, coordination control device 50 controls inverters 20 and 30 in coordination such that the intermediate value between the maximum value and minimum value of the voltage control values for motor generators MG1 and MG2 is equivalent to the intermediate potential of input voltage Vdc of inverters 20 and 30.

Figure 5:
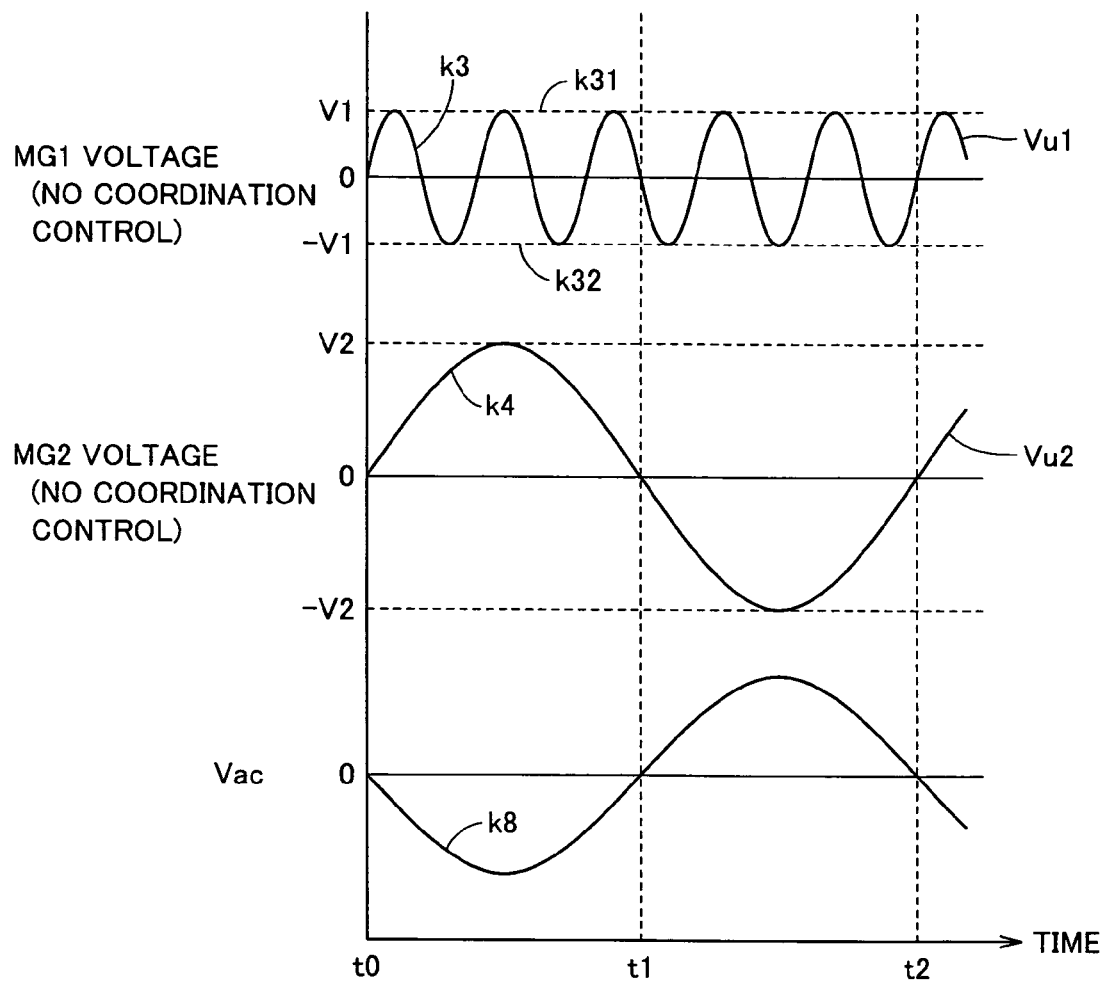
FIG. 5 is a first voltage waveform diagram of the motor generators.
Figure 6:
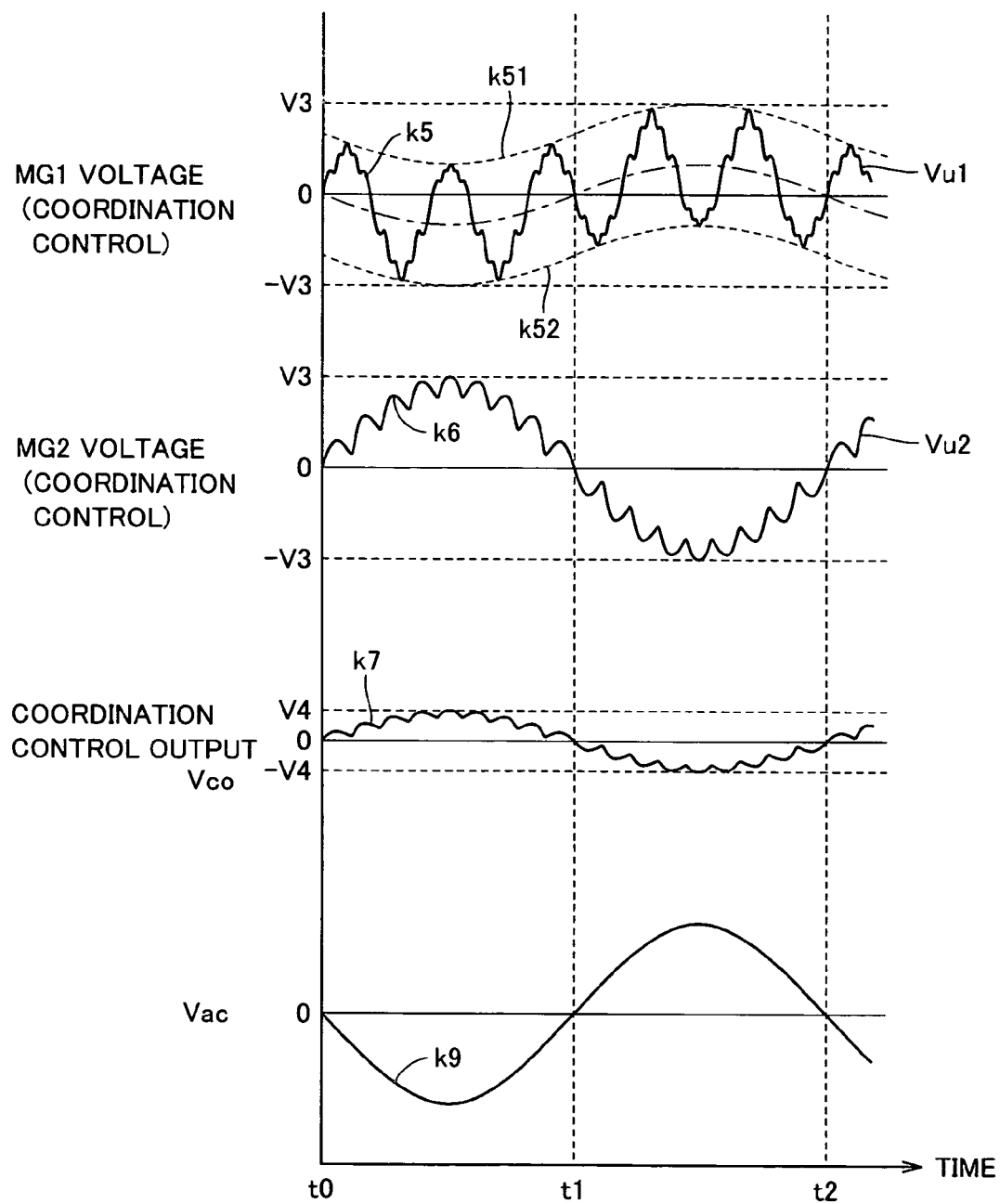
FIG. 6 is a second voltage waveform diagram of the motor generators.
Figure 7:
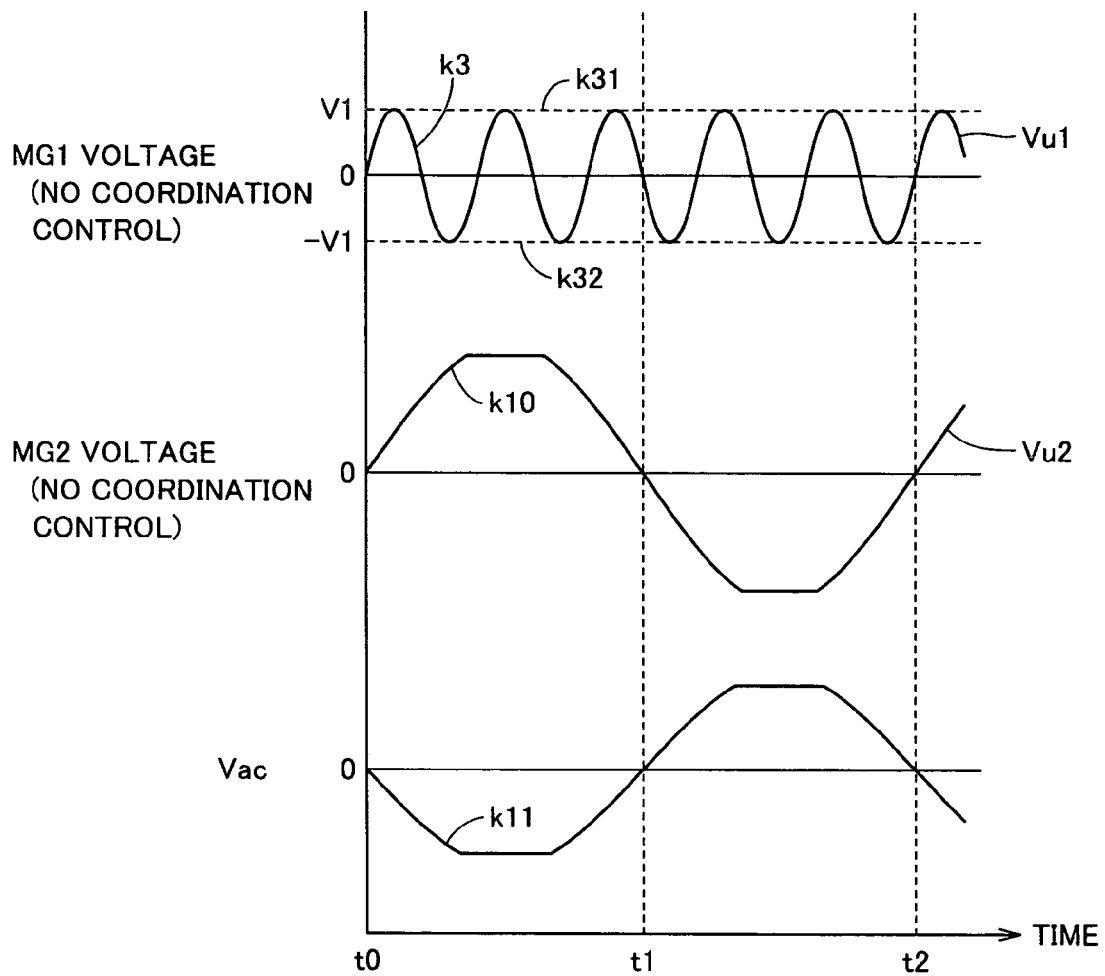
FIG. 7 is a third voltage waveform diagram of the motor generators.

FIGS. 5-7 are voltage waveform diagrams of motor generators MG1 and MG2. FIG. 5 corresponds to the case where it is assumed that coordination control of motor generators MG1 and MG2 is not conducted. FIG. 6 corresponds to the case where coordination control of motor generators MG1 and MG2 through coordination control device 50 is carried out. FIG. 6 represents the voltage waveform when AC voltage Vac is distorted in the case where coordination control is not effected. It is to be noted that FIGS. 5-7 represent voltage waveforms when AC voltage Vac is generated across neutral points of motor generators MG1 and MG2 while motor generator MG1 is regenerative-driven, typically of only the U-phase voltage at motor generators MG1 and MG2.

Referring to FIG. 5, curve k3 represents U-phase voltage Vu1 of motor generator MG1, absent of coordination control. Lines k3 and k32 represent envelopes of the phase voltage of motor generator MG1, absent of coordination control. Curve k4 represents U-phase voltage Vu2 of motor generator MG2, absent of coordination control. Curve k8 represents AC voltage Vac, absent of coordination control. If coordination control of inverters 20 and 30 is not effected, inverter 20 controls the neutral point potential of motor generator MG1 so as to attain the level of the intermediate potential of input voltage Vdc (voltage 0 in the drawing), whereas inverter 30 controls the neutral point potential of motor generator MG2 so as to attain the level of AC voltage Vac, as shown by curves k3 and k4. In other words, only inverter 30 corresponding to motor generator MG2 is involved in the generation of AC voltage Vac, whereas inverter 20 corresponding to motor generator MG1 is involved in only the regenerative drive of motor generator MG1.

As a result, the balance between maximum voltage V1 applied to motor generator MG1 and maximum voltage V2 applied to motor generator MG2 is disturbed, so that maximum voltage V2 applied to motor generator MG2 becomes larger than maximum voltage V1 applied to motor generator MG1 in the case shown in the drawings. If maximum voltage V2 exceeds the system voltage (input voltage Vdc of inverters 20 and 30), AC voltage Vac will be distorted by the voltage shortage.

Referring to FIG. 6, curve k5 represents U-phase voltage Vu1 of motor generator MG1 when coordination control is effected. Curves k51 and k52 represent envelopes of the phase voltage of motor generator MG1 when coordination control is effected. Curve k6 represents U-phase voltage Vu2 of motor generator MG2 when coordination control is effected. Curve k7 represents coordination control output Vco of coordination control unit 114 shown in FIG. 4. Curve k9 represents AC voltage Vac when coordination control is effected. In the case of the first embodiment in which coordination control of motor generators MG1 and MG2 is effected, inverters 20 and 30 are controlled in coordination by coordination control device 50 such that the intermediate value between the maximum value and minimum value of the voltage controls for motor generators MG1 and MG2 is always equivalent to the intermediate potential of input voltage Vdc of inverters 20 and 30 (voltage 0), as shown by curves k5 and k6. In other words, inverter 20 corresponding to motor generator MG1 is also involved in the generation of AC voltage Vac.

As a result, the maximum voltage applied to motor generators MG1 and MG2 both attain the level of voltage V3. Thus, the maximum voltage applied to motor generator MG2 is suppressed to voltage V3 from voltage V2. In other words, the event of the maximum voltage applied to motor generators MG1 and MG2 exceeding the level of input voltage Vdc of inverters 20 and 30 corresponding to the controllable range is suppressed to the minimum, and input voltage Vdc is used most effectively. Occurrence of distortion in AC voltage Vac as a result of voltage shortage is suppressed to the minimum.

Coordinate control output Vco shown at curve k7 corresponds to the intermediate value between the maximum value and minimum value of the voltages of motor generators MG1 and MG2 (curves K3 and k4) when coordination control of motor generators MG1 and MG2 is not effected. The voltage of motor generators MG1 and MG2 (curves k3 and k4) minus coordination control output Vco (curve k7) corresponds to the voltage of motor generators MG1 and MG2 (curves k5 and k6) when coordination control of motor generators MG1 and MG2 is effected.

Although the voltage of motor generators MG1 and MG2 exhibits a distorted waveform when coordination control is effected (curves k5 and k6), it has no effect on AC voltage Vac (curve k9) that is the potential difference between neutral points N1 and N2 of motor generators MG1 and MG2 and on the operation of motor generators MG1 and MG2 since the zero phase component of the voltage of motor generators MG1 and MG2 is operated with the same coordination control output Vco.

It is appreciated from FIG. 7 that, in the case where coordination control is not effected, the voltage control value for motor generator MG2 is distorted, as shown by curve k10, when the output value of AC voltage Vac is increased and the voltage control value for motor generator MG2 becomes higher than system voltage Vdc. As a result, AC voltage Vac is distorted, as shown by curve k11. In contrast, when coordination control is effected, the voltage of motor generator MG2 will not exceed system voltage Vdc since the voltage control value for motor generator MG2 is suppressed as set forth above. Therefore, AC voltage Vac is generated properly, as shown by curve k9 in FIG. 6.

In accordance with power output apparatus 100 of the first embodiment, coordination control device 50 controls inverters 20 and 30 in coordination such that the intermediate value between the maximum value and minimum value of the voltage controls for motor generators MG1 and MG2 attains the intermediate potential of input voltage Vdc of inverters 20 and 30. Therefore, the event of voltage control of inverters 20 and 30 being generated at a level exceeding the voltage controllable range by inverters 20 and 30 can be suppressed to the minimum.

Therefore, the maximum AC power with little distortion can be generated and provided to an external AC load connected to AC port 40.

From another perspective, the system stability is improved since input voltage Vdc of inverters 20 and 30 can be suppressed to the minimum.

Second Embodiment

In the previous first embodiment, motor generator MG2 was only employed for the generation of AC voltage Vac, with no particular control on the drive torque of motor generator MG2. In the second embodiment, AC voltage Vac can be generated across the neutral points of motor generators MG1 and MG2 while appropriately controlling the torque of motor generator MG2.

Referring to FIG. 1 again, a power output apparatus 100A according to the second embodiment includes a coordination control device 50A instead of coordination control device 50, in the configuration of operation output apparatus 100 of the first embodiment. The remaining configuration of power output apparatus 100A of the second embodiment is similar to that of power output apparatus 100 of the first embodiment.

Power output apparatus 100A is incorporated in, for example, a hybrid vehicle. Motor generator MG2 is coupled to the driving wheel (not shown) of the hybrid vehicle, and incorporated in the hybrid vehicle as the electric motor that drives the driving wheel. Specifically, motor generator MG2 generates the drive torque of the vehicle by the AC voltage from inverter 30, and generates AC voltage to be provided to inverter 30 in a regenerative braking mode. Motor generator MG1 coupled to engine ENG is incorporated in the hybrid vehicle functioning as a generator driven by engine ENG and also as a motor that can conduct engine starting.

At the request of an AC voltage output to an external AC load connected to AC port 40, AC voltage is generated across the neutral points of motor generators MG1 and MG2 by inverters 20 and 30. Motor generators MG1 and MG2 provide the AC voltage generated across the neutral points thereof to AC port 40 via AC output lines ACL1 and ACL2.

In the second embodiment, inverter 30 converts the DC voltage from power supply line PL2 into AC voltage for output to motor generator MG2 based on control signal PWM2 from coordination control device 50A. Accordingly, motor generator MG2 is driven so as to generate the desired torque. In a regenerative braking mode of motor generator MG2, inverters 30 converts the AC voltage output from motor generator MG2 into DC voltage for output onto power supply line PL2 based on control signal PWM2 from coordination control device 50A.

The operation of up-converter 10 and inverter 20 corresponding to motor generator MG1 are similar to those described in the first embodiment.

Coordination control device 50A generates control signal PWC to drive up-converter 10 based on torque control values TR1 and TR2 and the motor revolution counts of motor generators MG1 and MG2, the battery voltage of battery B, and input voltage Vdc of inverters 20 and 30. The generated control signal PWC is output to up-converter 10. The revolution count of motor generator MG2 is calculated based on rotation position θ2 detected by rotation sensor 66.

Coordination control device 50A generates control signal PWM1 to drive motor generator MG1, likewise coordination control device 50 of the first embodiment.

Coordination control device 50A also generates control signal PWM2 to drive motor generator MG2 based on the motor current and torque control value TR2 of motor generator MG2, input voltage Vdc, and rotation position θ2 of motor generator MG2.

At the request of an AC voltage output to an external AC load connected to AC port 40, coordination control device 50A generates control signals PWM1 and PWM2 while controlling the duty summation of the upper and lower arms of inverters 20 and 30 such that AC voltage is generated across the neutral points of motor generators MG1 and MG2.

Coordination control device 50A operates inverters 20 and 30 in coordination such that the intermediate value between the maximum value and minimum value of the voltage controls for motor generators MG1 and MG2 attains the intermediate potential of input voltage of inverters 20 and 30. Coordination control by coordination control device 50A will be described in details afterwards.

Figure 8:
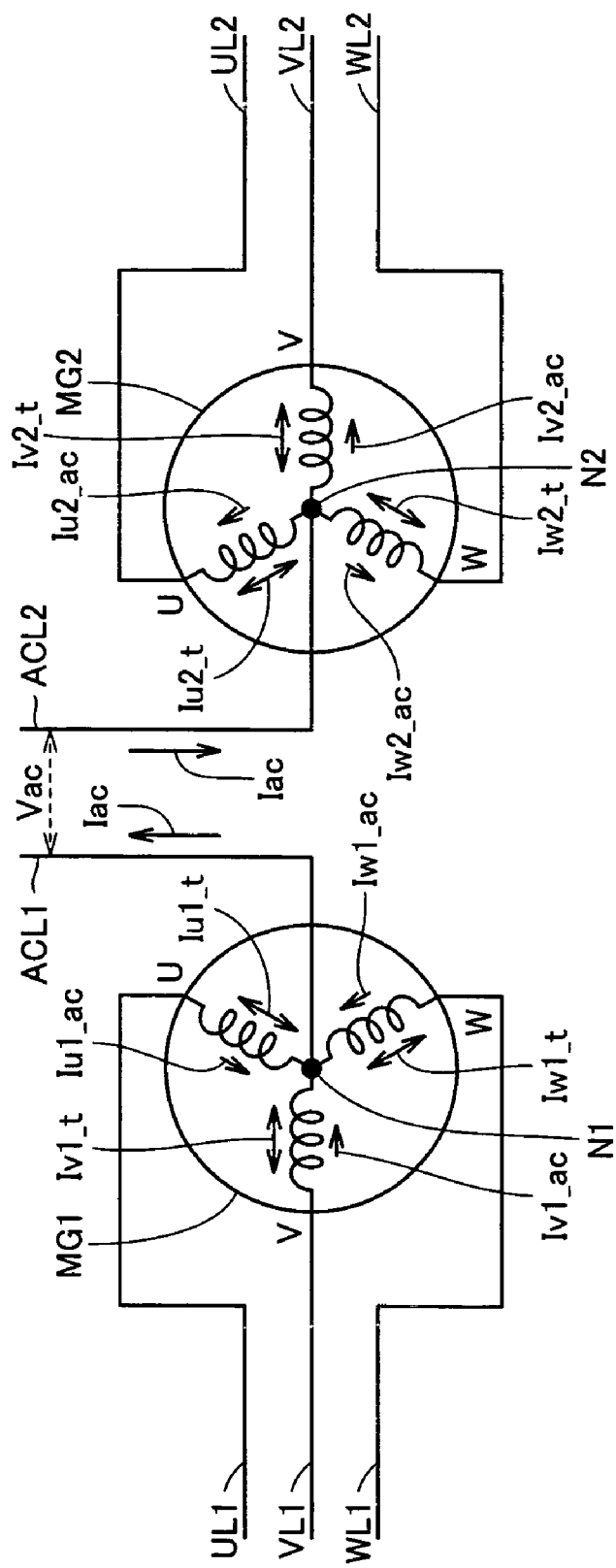
FIG. 8 is a diagram to describe current flowing to the motor generators at the power output apparatus according to a second embodiment of the present invention.

FIG. 8 is a diagram to describe current flowing to motor generators MG1 and MG2 at power output apparatus 100A of the second embodiment. FIG. 8 shows the current flow, when motor generator MG1 is driven in a regenerative manner and motor generator MG2 is driven in a power-running manner, together with the generation of AC voltage Vac. FIG. 8 also corresponds to the case where AC current Iac flows from neutral point N1 of motor generator MG1 to neutral point N2 of motor generator MG2.

Referring to FIG. 8, inverter 20 (not shown) connected to U-phase line UL1, V-phase line VL1 and W-phase line WL1 effects switching based on control signal PWM1 from coordination control device 50A (also not shown) to conduct the U-phase current formed of current components Iu1_t and Iu1_ac to the U-phase coil of motor generator MG1, the V-phase current formed of current components Iv1_t and Iv1_ac to the V-phase coil of motor generator MG1, and the W-phase current formed of current components Iw1_t and Iw1_ac to the W-phase coil of motor generator MG1.

Inverter 30 (not shown) connected to U-phase line UL2, V-phase line VL2 and W-phase line WL2 effects switching based on control signal PWM2 from coordination control device 50A to conduct the U-phase current formed of current components Iu2_t and Iu2_ac to the U-phase coil of motor generator MG2, the V-phase current formed of current components Iv2_t and Iv2_ac to the V-phase coil of motor generator MG2, and the W-phase current formed of current components Iw2_t and Iw2_ac to the W-phase coil of motor generator MG2, respectively.

Current components Iu2_t, Iv2_t and Iw2_t are currents to generate the power-running torque at motor generator MG2. Current components Iu2_ac, Iv2_ac and Iw2_ac are currents to conduct AC current Iac from AC output line ACL2 to neutral point N2 of motor generator MG2. The total value of current components Iu1_ac, Iv1_ac and Iw1_ac and the total value of current components Iu2_ac, Iv2_ac and Iw2_ac each are identified as AC current Iac.

Figure 9:
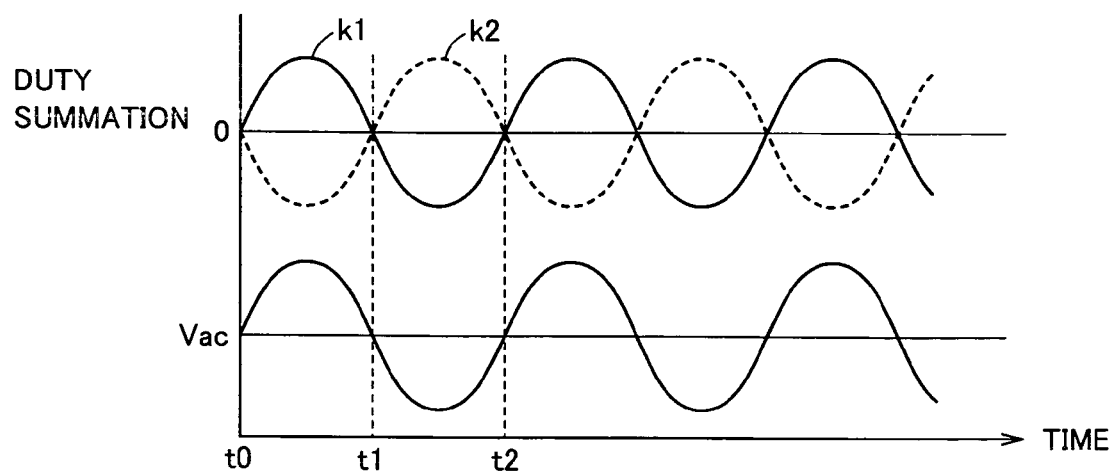
FIG. 9 is a waveform diagram of the duty summation and AC voltage.

FIG. 9 is a waveform diagram of the duty summation and AC voltage Vac. Referring to FIG. 9, curve k1 represents the change in duty summation according to the switching control of inverter 20, whereas curve k2 represents the change in duty summation according to the switching control of inverter 30.

At power output apparatus 100A of the second embodiment, coordination control device 50A alters the duty summation of inverter 20 periodically at the commercial AC frequency according to curve k1, and alters the duty summation of inverter 30 periodically at the commercial AC frequency according to curve k2. The duty summation of inverter 30 is altered periodically with a phase that is an inverted version of the phase with which the duty summation of inverter 20 is altered. Accordingly, AC voltage Vac of the positive side is generated across neutral points N1 and N2 of motor generators MG1 and MG2 during time t0-t1. During time t1-t2, AC voltage Vac of the negative side is generated across neutral points N1 and N2.

Figure 10:
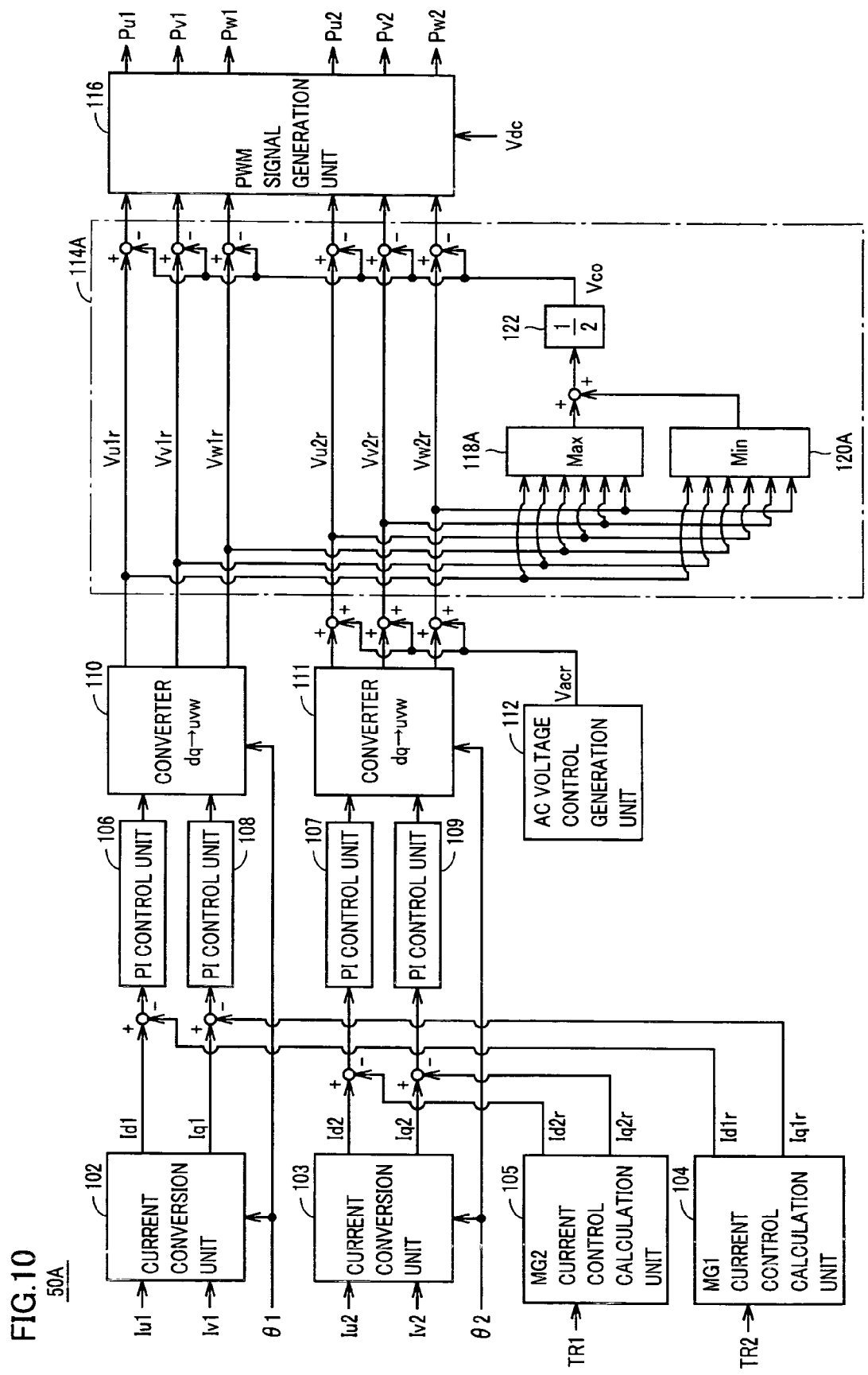
FIG. 10 is a functional block diagram of the configuration of the portion related to coordination control of a coordination control device according to the second embodiment of the present invention.

FIG. 10 is a functional block diagram representing a configuration of the portion related to coordination control of coordination control device 50A of the second embodiment. Referring to FIG. 10, coordination control device 50A is based on the configuration of coordination control device 50 of the first embodiment shown in FIG. 4, and additionally includes a current conversion unit 103, a MG2 current control calculation unit 105, PI control units 107 and 109, and a converter 111. Coordination control device 50A also includes a coordination control unit 114A instead of coordination control unit 114. Coordination control unit 114A is based on the configuration of coordination control unit 114 of the first embodiment, and includes a maximum value calculation unit 118A and a minimum value calculation unit 120A, instead of maximum value calculation unit 118 and minimum value calculation unit 120, respectively.

Current conversion unit 103 uses rotation position θ2 of motor generator MG2 detected by rotation sensor 66 to convert U-phase current Iu2 and V-phase current Iv2 detected by current sensors 58 and 60, respectively, into a d-axis current Id2 and q-axis current Iq2. MG2 current control calculation unit 105 calculates current controls Id2r and Iq2r of motor generator MG2 at the d-axis and q-axis, based on torque control value TR2 of motor generator MG2.

PI control unit 107 receives the deviation between d-axis current Id2 from current conversion unit 103 and current control value Id2r from MG2 current control calculation unit 105 to conduct a proportional integral operation with the deviation as the input. The calculated result is output to converter 111. PI control unit 109 receives the deviation between q-axis current Iq2 from current conversion unit 103 and current control value Iq2r from MG2 current control calculation unit 105 to conduct a proportional integral operation with the deviation thereof as the input. The calculated result is output to converter 111.

Converter 111 uses rotation position θ2 of motor generator MG2 to convert the voltage control value from PI control units 107 and 109 into U-phase voltage control value Vu2r, V-phase voltage control value Vv2r, and W-phase voltage control value Vw2r of motor generator MG2.

Maximum value calculation unit 118A of coordination control unit 114A obtains the maximum value of U-phase voltage control value Vu1r, V-phase control value Vv1r and W-phase voltage control value Vw1r from converter 110, and U-phase voltage control value Vu2r, V-phase voltage control value Vv2r and W-phase voltage control value Vw2r, i.e. voltage control value Vacr from AC voltage control generation unit 112 added to the output from converter 111, for output. Minimum value calculation unit 120A obtains the minimum value of U-phase control value Vu1r, V-phase control value Vv1r and W-phase control value Vw1r, and U-phase voltage control value Vu2r, V-phase voltage control value Vv2r and W-phase voltage control value Vw2r, for output.

Coordination control unit 114A subtracts coordination control output Vco from each of U-phase voltage control value Vu1r, V-phase voltage control value Vv1r and W-phase voltage control value Vw1r for motor generator MG1, and U-phase voltage control value Vu2r, V-phase voltage control value Vv2r and W-phase voltage control value Vw2r for motor generator MG2. Each calculated result is output to PWM signal generation unit 116 as the final voltage control value of motor generators MG1 and MG2.

In coordination control device 50A of the second embodiment, inverters 20 and 30 are controlled in coordination by coordination control unit 114A while the drive torque of motor generator MG2 is controlled by current conversion unit 103, MG2 current control calculation unit 105, PI control units 107 and 109, and converter 111.

In accordance with power output apparatus 100A of the second embodiment, the maximum AC power with little distortion is generated across the neutral points of motor generators MG1 and MG2, which can be output to an external AC load connected to AC port 40, while conducting regenerative power generation by motor generator MG1 connected to engine ENG and generating drive torque at the driving wheels by motor generator MG2 coupled thereto.

Third Embodiment

The third embodiment is directed to suppressing variation in AC voltage Vac generated across neutral points of motor generators MG1 and MG2 by compensating for voltage drop caused by the internal impedance of motor generators MG1 and MG2.

Referring to FIG. 1 again, a power output apparatus 100B according to the third embodiment of the present invention is based on the configuration of power output apparatus 100 of the first embodiment, and includes a coordination control device 50B instead of coordination control device 50. The remaining configuration of power output apparatus 100B of the third embodiment is similar to that of power output apparatus 100 of the first embodiment.

Figure 11:
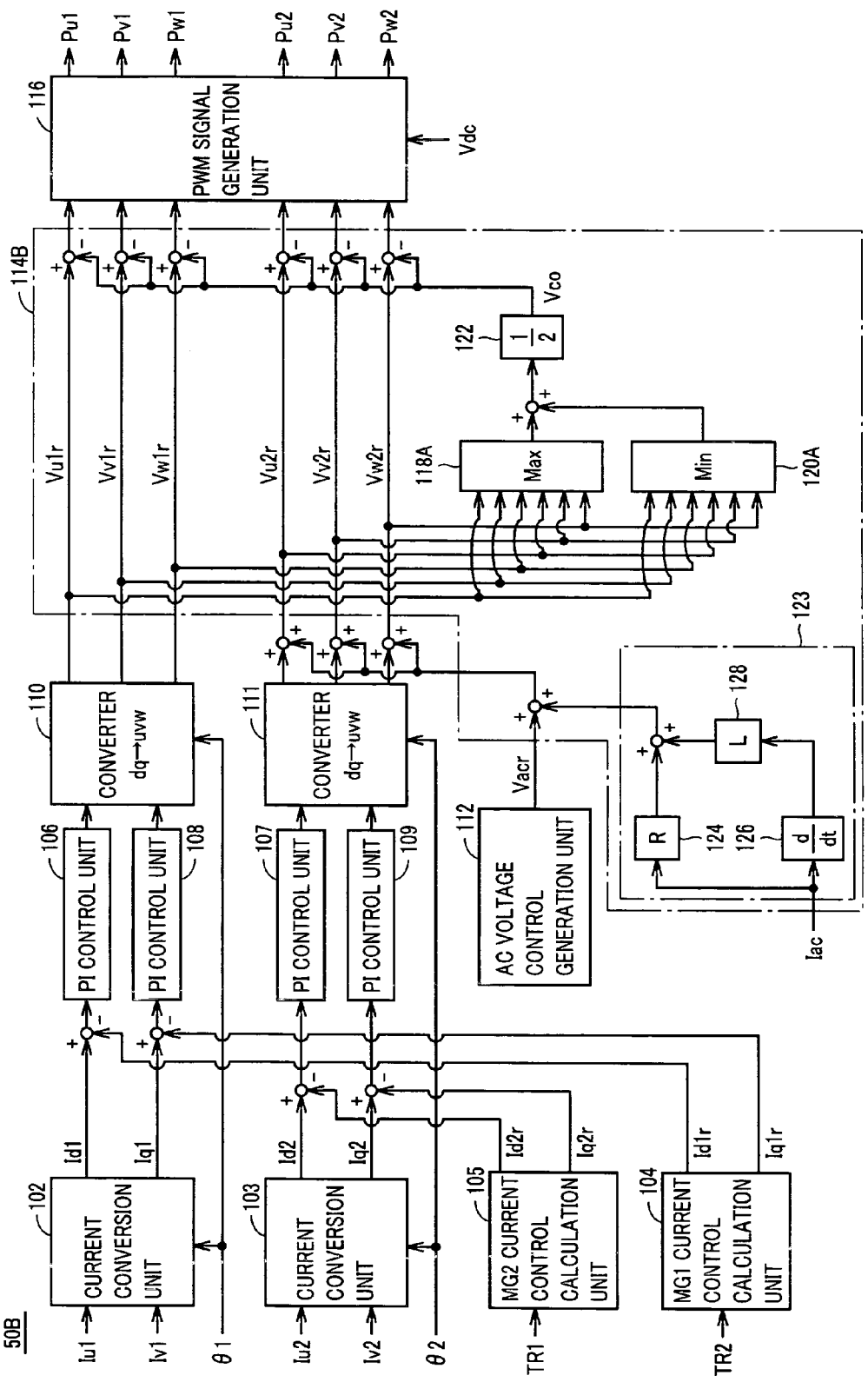
FIG. 11 is a functional block diagram of the configuration of the portion related to coordination control of a coordination control device according to the third embodiment of the present invention.

FIG. 11 is a functional block diagram representing a configuration of the portion related to coordination control of coordination control device 50B of the third embodiment. Referring to FIG. 11, coordination control device 50B is based on the configuration of coordination control device 50A of the second embodiment shown in FIG. 10, and includes a coordination control unit 114B instead of coordination control unit 114A. Coordination control unit 114B is based on coordination control unit 114A, and further includes a voltage compensation unit 123.

Voltage compensation unit 123 includes first to third calculation units 124, 126, and 128, respectively. First calculation unit 124 multiplies AC current Iac detected by current sensor 62 not shown by an armature resistance R of motor generators MG1 and MG2 to output the calculated result. Second calculation unit 126 carries out a derivative operation of AC current Iac to output the calculated result to third calculation unit 128. Third calculation unit 128 multiplies the calculated result from second calculation unit 126 by armature inductance L of motor generators MG1 and MG2 for output.

As used herein, armature resistance R of motor generators MG1 and MG2 is the sum of armature resistance R1 of motor generator MG1 and armature resistance R2 of motor generator MG2. Armature inductance L of motor generators MG1 and MG2 is the sum of armature inductance L1 of motor generator MG1 and armature inductance L2 of motor generator MG2.

The added value of the outputs from first calculation unit 124 and third calculation unit 128 is added as a correction value compensating for the voltage drop by the internal impedance of motor generators MG1 and MG2 to voltage control value Vacr from AC voltage control generation unit 112. The corrected AC voltage control value is added to the output from converter 111.

The remaining operation of coordination control device 50B is similar to that of coordination control device 50A of the second embodiment.

Although the above description is based on compensating for the voltage drop caused by the internal impedance of motor generators MG1 and MG2, based on the model of motor generators MG1 and MG2 that are represented using armature resistance R and armature inductance L, the voltage drop by the internal impedance of motor generators MG1 and MG2 alternatively can be compensated for by measuring the AC voltage Vac generated across the neutral points of motor generators MG1 and MG2 to be used for feedback operation.

In accordance with power output apparatus 100B of the third embodiment, voltage drop by the internal impedance of motor generators MG1 and MG2 is compensated for. Therefore, the accuracy of voltage control for inverters 20 and 30 is improved. As a result, variation in AC voltage Vac that is generated across the neutral points of motor generators MG1 and MG2 can be suppressed.

As mentioned before, power output apparatus 100A of the second embodiment or power output apparatus 100B of the third embodiment is incorporated in a hybrid vehicle.

Figure 12:
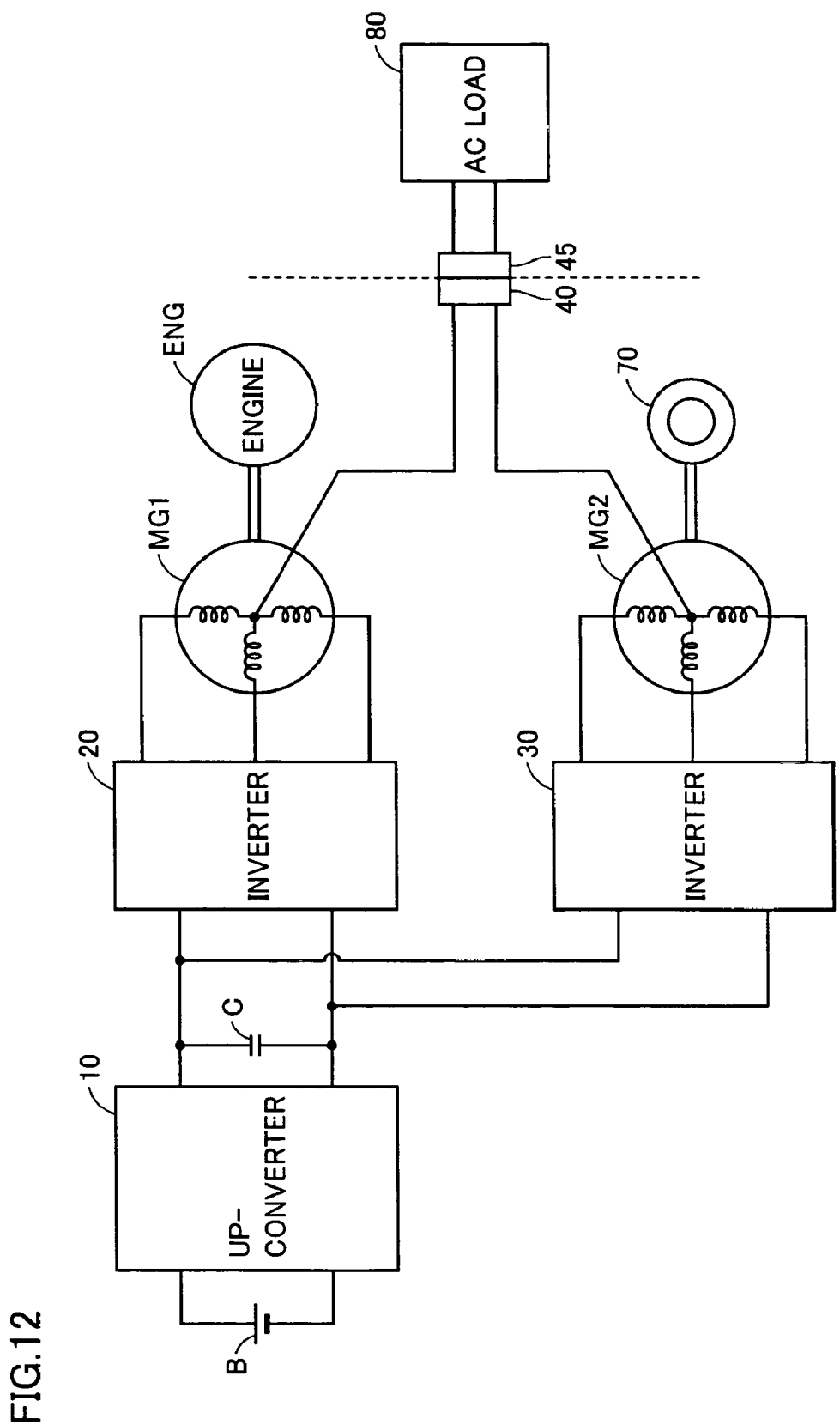
FIG. 12 is a block diagram of the power train of a hybrid vehicle to which the power output apparatus of the second or third embodiment is incorporated.

FIG. 12 is a block diagram of the power train of the hybrid vehicle to which power output apparatus 100A of the second embodiment or power output apparatus 100B of the third embodiment is incorporated. Referring to FIG. 12, motor generator MG1 is connected to engine ENG. Motor generator MG1 starts engine ENG and conducts regenerative power generation by the rotating force from engine ENG. Motor generator MG2 is coupled to driving wheel 70 to drive the same, and generates power in a regenerative braking mode of the hybrid vehicle.

AC port 40 is connected to a port 45 of AC load 80 identified as an external AC load. Power output apparatus 100A or 100B supplies AC voltage Vac to AC load 80 via AC port 40 and port 45. Accordingly, AC load 80 can operate by receiving AC voltage Vac supply from the hybrid vehicle.

Thus, the hybrid vehicle in which a power output apparatus of the present invention is incorporated can be utilized as a commercial AC power supply. The hybrid vehicle possesses the added value as a power supply apparatus while realizing reduction in size, weight, and cost of the vehicle since a dedicated inverter to generate AC voltage Vac is absent.

The above description is based on a power output apparatus incorporated in a hybrid vehicle. The present invention is not limited thereto, and the power output apparatus can be incorporated in an electric vehicle, or a fuel cell electric vehicle.

In the above description, motor generators MG1 and MG2 correspond to "first motor generator" and "second motor generator", respectively. Inverters 20 and 30 correspond to "first inverter" and "second inverter", respectively, of the present invention. Coordination control devices 50, 50A, and 50B correspond to "control device" of the present invention. Battery B corresponds to "DC power supply" of the present invention.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A power output apparatus comprising:
first and second motor generators,
first and second inverters connected to said first and second motor generators, respectively, and receiving an input voltage from a voltage supply line, and
a control device controlling an operation of said first and second inverters such that AC voltage is generated across neutral points of said first and second motor generators using said input voltage,
wherein said control device controls said first and second inverters in coordination such that an intermediate value between a maximum value and a minimum value of voltage controls for said first and second motor generators is equivalent to an intermediate potential of said input voltage.

2. The power output apparatus according to claim 1, wherein said control device further controls an operation of said first inverter and/or said second inverter such that at least one of said first and second motor generators is driven using said input voltage.

3. The power operation apparatus according to claim 1, wherein said control device includes a coordination control unit that controls said first and second inverters in coordination by calculating said intermediate value, and subtracting said calculated intermediate value from each phase voltage control for said first and second motor generators.

4. The power output apparatus according to claim 1, wherein said control device further includes a voltage compensation unit compensating for voltage drop caused by internal impedance of said first and second motor generators.

5. The power output apparatus according to claim 4, wherein said voltage compensation unit calculates a voltage compensation value based on AC current flowing across the neutral points of said first and second motor generators to correct a control value of the AC voltage that is to be generated across the neutral points of said first and second motor generators, using the calculated voltage compensation value.

6. The power output apparatus according to claim 1, further comprising:
a DC power supply, and
an up-converter boosting DC voltage output from said DC power supply and providing the boosted voltage onto said voltage supply line,
wherein said control device further controls an operation of said up-converter such that the DC voltage from said DC power supply is boosted to said input voltage.

7. A vehicle comprising:
the power output apparatus defined in claim 1,
an internal combustion engine coupled to the first motor generator included in said power output apparatus, and a driving wheel coupled to the second motor generator included in said power output apparatus, and driven by said second motor generator, wherein the control device included in said power output apparatus controls an operation of the first and second inverters included in said power output apparatus such that said first and second motor generators are driven and AC voltage is generated across the neutral points of said first and second motor generators using said input voltage, and said first and second motor generators output the AC voltage generated across neutral points of each other to an external electric load electrically connected between said neutral points.

8. A vehicle comprising:

the power output apparatus defined in claim 2, an internal combustion engine coupled to the first motor generator included in said power output apparatus, and a driving wheel coupled to the second motor generator included in said power output apparatus, and driven by said second motor generator, wherein the control device included in said power output apparatus controls an operation of the first and second inverters included in said power output apparatus such that said first and second motor generators are driven and AC voltage is generated across the neutral points of said first and second motor generators using said input voltage, and said first and second motor generators output the AC voltage generated across neutral points of each other to an external electric load electrically connected between said neutral points.

9. A vehicle comprising:

the power output apparatus defined in claim 3, an internal combustion engine coupled to the first motor generator included in said power output apparatus, and a driving wheel coupled to the second motor generator included in said power output apparatus, and driven by said second motor generator, wherein the control device included in said power output apparatus controls an operation of the first and second inverters included in said power output apparatus such that said first and second motor generators are driven and AC voltage is generated across the neutral points of said first and second motor generators using said input voltage, and said first and second motor generators output the AC voltage generated across neutral points of each other to an external electric load electrically connected between said neutral points.

10. A vehicle comprising:

the power output apparatus defined in claim 4, an internal combustion engine coupled to the first motor generator included in said power output apparatus, and a driving wheel coupled to the second motor generator included in said power output apparatus, and driven by said second motor generator, wherein the control device included in said power output apparatus controls an operation of the first and second inverters included in said power output apparatus such that said first and second motor generators are driven and AC voltage is generated across the neutral points of said first and second motor generators using said input voltage, and said first and second motor generators output the AC voltage generated across neutral points of each other to an external electric load electrically connected between said neutral points.

11. A vehicle comprising:

the power output apparatus defined in claim 5, an internal combustion engine coupled to the first motor generator included in said power output apparatus, and a driving wheel coupled to the second motor generator included in said power output apparatus, and driven by said second motor generator, wherein the control device included in said power output apparatus controls an operation of the first and second inverters included in said power output apparatus such that said first and second motor generators are driven and AC voltage is generated across the neutral points of said first and second motor generators using said input voltage, and said first and second motor generators output the AC voltage generated across neutral points of each other to an external electric load electrically connected between said neutral points.

12. A vehicle comprising:

the power output apparatus defined in claim 6, an internal combustion engine coupled to the first motor generator included in said power output apparatus, and a driving wheel coupled to the second motor generator included in said power output apparatus, and driven by said second motor generator, wherein the control device included in said power output apparatus controls an operation of the first and second inverters included in said power output apparatus such that said first and second motor generators are driven and AC voltage is generated across the neutral points of said first and second motor generators using said input voltage, and said first and second motor generators output the AC voltage generated across neutral points of each other to an external electric load electrically connected between said neutral points.

13. The power output apparatus according to claim 1, further comprising an output terminal electrically connected to the neutral points of said first and second motor generators to provide the AC voltage generated across the neutral points of said first and second motor generators to an electric load.

14. The vehicle according to claim 7, further comprising an output terminal to provide the AC voltage generated across the neutral points of said first and second motor generators to said external electric load.

* * * * *